United States Patent
Bishop et al.

(10) Patent No.: US 12,164,954 B2
(45) Date of Patent: Dec. 10, 2024

(54) JOB PROCESSING IN QUANTUM COMPUTING ENABLED CLOUD ENVIRONMENTS

(71) Applicant: International Business Machines Corporation, Armonk, NY (US)

(72) Inventors: Lev Samuel Bishop, Dobbs Ferry, NY (US); Andrew W. Cross, Yorktown Heights, NY (US); Ismael Faro Sertage, Yorktown Heights, NY (US); Jay M. Gambetta, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 757 days.

(21) Appl. No.: 17/161,838

(22) Filed: Jan. 29, 2021

(65) Prior Publication Data

US 2022/0050710 A1     Feb. 17, 2022

Related U.S. Application Data

(63) Continuation of application No. 15/719,872, filed on Sep. 29, 2017, now Pat. No. 10,996,979.

(51) Int. Cl.
*G06F 9/48*     (2006.01)
*G06N 10/00*    (2022.01)

(52) U.S. Cl.
CPC ........... *G06F 9/4881* (2013.01); *G06N 10/00* (2019.01)

(58) Field of Classification Search
CPC .................................................. G06F 9/4881
See application file for complete search history.

(56) References Cited

U.S. PATENT DOCUMENTS 9,537,953 B1     1/2017 Dadashikelayeh et al.
2013/0308956 A1*  11/2013 Meyers .............. G06N 10/00
                                              977/933

(Continued)

FOREIGN PATENT DOCUMENTS

CN       105531725 A    4/2016
JP       2013114366 A   6/2013
WO       2006061926 A1  6/2006

OTHER PUBLICATIONS

P201701491CN01, Application No. 201780095360.6, OA1, Apr. 1, 2023.

(Continued)

*Primary Examiner* — Charlie Sun
(74) *Attorney, Agent, or Firm* — Garg Law Firm, PLLC; Rakesh Garg; Erik Johnson

(57) ABSTRACT

A compatibility is ascertained between a configuration of a quantum processor (q-processor) of a quantum cloud compute node (QCCN) in a quantum cloud environment (QCE) and an operation requested in a first instruction in a portion (q-portion) of a job submitted to the QCE, the QCE including the QCCN and a conventional compute node (CCN), the CCN including a conventional processor configured for binary computations. In response to the ascertaining, a quantum instruction (q-instruction) is constructed corresponding to the first instruction. The q-instruction is executed using the q-processor of the QCCN to produce a quantum output signal (q-signal). The q-signal is transformed into a corresponding quantum computing result (q-result). A final result is returned to a submitting system that submitted the job, wherein the final result comprises the q-result.

25 Claims, 6 Drawing Sheets

(56) References Cited

U.S. PATENT DOCUMENTS

2015/0006443 A1 1/2015 Rose et al.
2016/0338075 A1 11/2016 McKibben

OTHER PUBLICATIONS

P201701491JP01, Receive Rejection, Application No. 2020-516844, Jun. 22, 2021.
P201701491JP01, Receive Rejection Translation, Application No. 2020-516844, Jun. 22, 2021.
List of all IBM related dockets, 2021.

* cited by examiner

JOB PROCESSING IN QUANTUM COMPUTING ENABLED CLOUD ENVIRONMENTS

BACKGROUND

The present invention relates generally to a method, system, and computer program product for using quantum computing systems. More particularly, the present invention relates to a method, system, and computer program product for job processing in quantum computing enabled cloud environments.

Hereinafter, a "Q" prefix in a word of phrase is indicative of a reference of that word or phrase in a quantum computing context unless expressly distinguished where used.

Nature—including molecules—follows the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a processor fabricated using semiconductor technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits) to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0) can depend on the state of another, and that there is more information that can be ascertained about the two qubits when they are entangled than when they are treated individually. Using these two principles, qubits operate as more sophisticated processors of information, enabling quantum computers to function in ways that allow them to solve difficult problems that are intractable using conventional computers. IBM has successfully constructed and demonstrated the operability of a quantum processor (IBM is a registered trademark of International Business Machines corporation in the United States and in other countries.)

The illustrative embodiments recognize that using a quantum computer or a quantum compute node ("QC" or "QCN," respectively) is a significantly different proposition than using a CN. Presently, cloud computing environments are entirely comprised of CNs, and various methodologies for operating those cloud environments are well-known. However, the illustrative embodiments recognize that operating a cloud environment, which includes at least one QCN is an entirely different problem, not solved using the architecture or methodology of operating a cloud of purely CN type machines.

QCNs have been proven to be usable for data computing purposes. A cloud environment that includes QCNs is not operable without a Q-specific mechanism to direct jobs to QCNs, or combinations of QCNs and CNs in hybrid clouds. Therefore, the illustrative embodiments recognize that a system is needed that can adapt portions of incoming data processing jobs for q-computing, manage job division between QCNs and CNs, suitably adapt q-signals from QCNs into q-results, and combine the q-results with results obtained from CNs to produce a result that is acceptable in response to the job.

SUMMARY

The illustrative embodiments provide a method, system, and computer program product. An embodiment includes a method that ascertains a compatibility between a configuration of a quantum processor (q-processor) of a quantum cloud compute node (QCCN) in a quantum cloud environment (QCE)and an operation requested in a first instruction in a portion (q-portion) of a job submitted to the QCE, the QCE comprising the QCCN and a conventional compute node (CCN), the CCN comprising a conventional processor configured for binary computations. The embodiment constructs, responsive to the ascertaining, a quantum instruction (q-instruction) corresponding to the first instruction. The embodiment executes the q-instruction using the q-processor of the QCCN to produce a quantum output signal (q-signal). The embodiment transforms the q-signal into a corresponding quantum computing result (q-result). The embodiment returns a final result to a submitting system that submitted the job, wherein the final result comprises the q-result. Thus, an embodiment appropriately manages the usage of quantum computing resources in a QCE where jobs of mixed computing requirements may be submitted by determining job suitability for quantum computing and effecting the quantum computing for only those portions that match one or more characteristics of a configured quantum processor.

Another embodiment further corrects an error in the q-signal using hardware associated with the q-processor to produce a corrected q-signal. Thus, an embodiment operates the quantum computing resource in the QCE to improve the reliability and stability of the quantum computing performed by the configured quantum processor.

Another embodiment further demodulating the q-signal. The embodiment digitizes the q-signal. The embodiment extracts an initial quantum computing result (initial q-result) from the digitized q-signal. Thus, an embodiment provides a method for reliably operating the quantum computing resource in the QCE to perform the quantum computing and obtain a q-result.

Another embodiment further post-processes the initial q-result, wherein the post-processing comprises applying a statistical model to the initial q-result to obtain a new q-result, and wherein the new q-result has a greater-than threshold probability of being a correct result computed by the q-processor. Thus, an embodiment operates the quantum computing resource in the QCE to improve the reliability and stability of the quantum computing performed by the configured q-processor.

In another embodiment, the q-instruction is encoded using a quantum instruction language. Thus, an embodiment provides a particular manner of enabling an instruction to execute using the q-processor.

In another embodiment, the quantum instruction language comprises Quantum Assembly Language (QASM). Thus, an embodiment provides a particular manner of enabling an instruction to execute using the q-processor.

Another embodiment further constructs, responsive to determining that a second instruction in the q-portion is incompatible with a quantum computing configuration of a q-processor in the QCCN, a conventional instruction corresponding to the second instruction. The embodiment executes the conventional instruction on the CCN in the QCE. Thus, an embodiment appropriately splits the job between quantum computing resources and conventional computing resources in a QCE.

Another embodiment further obtains a conventional result from the executing the convention instruction on the CCN. The embodiment combines the conventional result with the q-result to produce the final result. Thus, an embodiment appropriately splits the job between quantum computing resources and conventional computing resources in a QCE, and produces an output for the job that makes the split execution transparent to the job submitter.

Another embodiment further constructs, corresponding to an instruction in a second portion in the job, a conventional instruction. The embodiment schedules the conventional instruction to execute on the CCN in the QCE. Thus, an embodiment appropriately splits the job between quantum computing resources and conventional computing resources in a QCE.

In another embodiment, the QCCN is one of a set of QCCNs operating in the QCE, and wherein the CCN is one of a set of CCNs operating in the QCE. Thus, an embodiment provides one manner of configuring the QCE.

In another embodiment, the configuration of the q-processor comprises a number of qubits available in the q-processor, and wherein the ascertaining comprises determining that the operation is performable using the number of qubits. Thus, an embodiment provides one manner of configuring and using the quantum computing resources in the QCE.

In another embodiment, the configuration of the q-processor comprises a type of operation configured to be performed by the q-processor, and wherein the ascertaining comprises determining that the operation requested in the first instruction is performable using a second operation configured in the q-processor, the second operation using a set of qubits. Thus, an embodiment provides another manner of configuring and using the quantum computing resources in the QCE.

In another embodiment, the configuration of the q-processor comprises an error rate in the q-signal produced by the q-processor, wherein the ascertaining comprises determining that an error tolerance of the q-portion is at least equal to the error rate. Thus, an embodiment provides another manner of configuring and using the quantum computing resources in the QCE.

Another embodiment further identifies, in the job, the q-portion using an indication associated with the q-portion, the indication referring to a suitability of the q-portion for quantum computing. Thus, an embodiment provides one method for determining whether a job can benefit from using the quantum computing resources in the QCE.

Another embodiment further identifies, in the job, the q-portion using the operation requested in the first instruction, the operation being configured in the QCCN using the q-processor. Thus, an embodiment provides one method for determining whether a job can benefit from using the quantum computing resources in the QCE.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
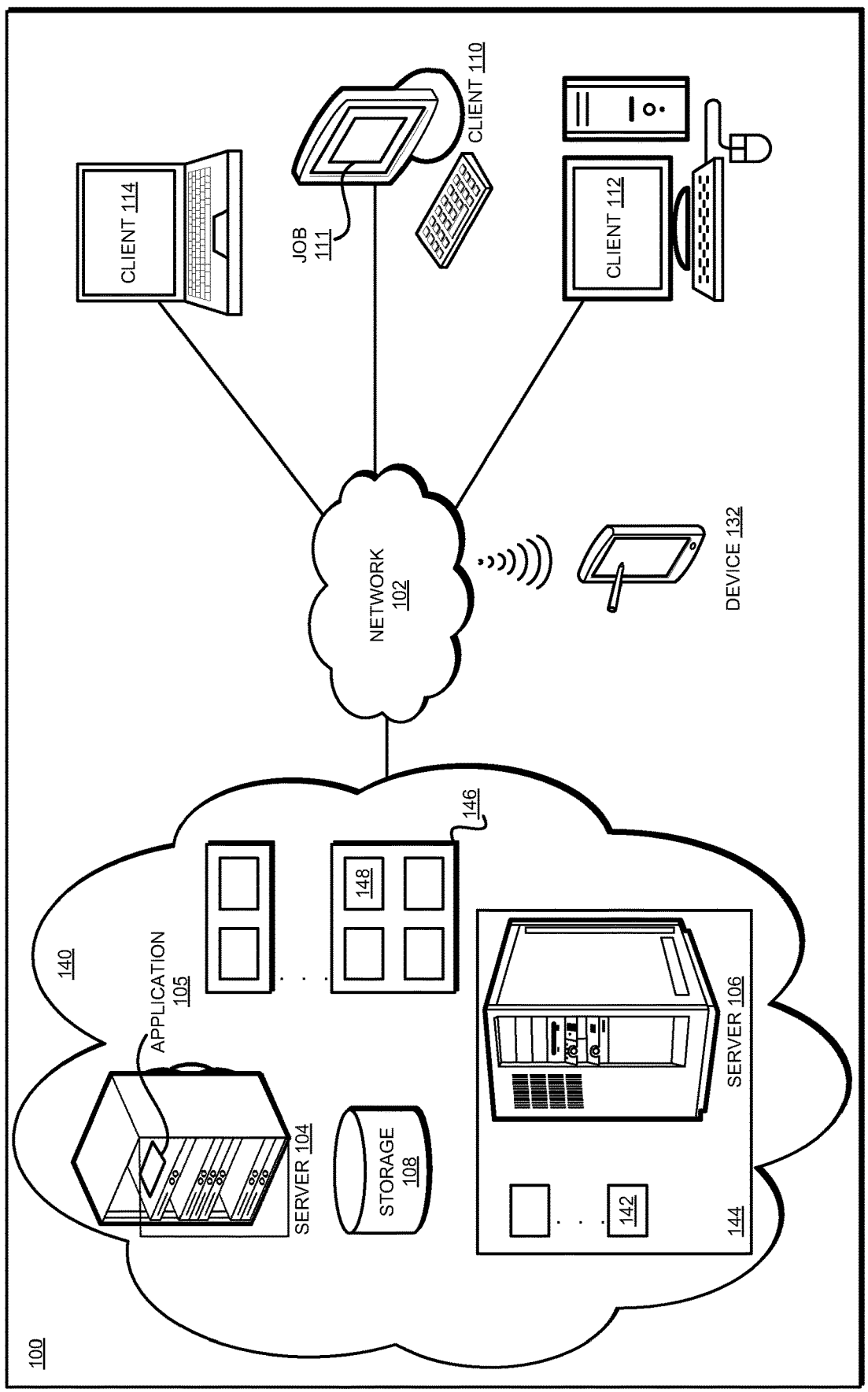
FIG. 1 depicts a block diagram of a network of data processing systems in which illustrative embodiments may be implemented.

The illustrative embodiments recognize that the presently available tools or solutions do not address these needs/problems or provide adequate solutions for these needs/problems. The illustrative embodiments used to describe the invention generally address and solve the above-described problems and other related problems by job processing in quantum computing enabled cloud environments.

An embodiment can be implemented as a combination of certain q-computing hardware components and a software application. An implementation of the software application portion of an embodiment, or one or more components thereof, can be configured as a modification of an existing CN, with the software application executing in some combination of (i) the CN itself, (ii) a data processing system communicating with the CN over short-range radio or a wired or wireline local area network (LAN), and (iii) a data processing system communicating with the CN over a wide area network (WAN).

A job sender is any data processing system of any type or configuration that sends a data processing job which requires data computing. Particularly, the job sender sends the job to a cloud environment. In accordance with the illustrative embodiments, the cloud environment includes at least one QCN, and at least one CN on which an embodiment can execute. Such a cloud computing environment is hereinafter referred to as a quantum cloud environment (QCE). The QCN operating in a QCE is referred to as a quantum cloud compute node (QCCN).

The QCE may include one or more CNs in a suitable configuration—such as a cluster—to process jobs, or portions thereof, using conventional binary computing. Such a CN is referred to herein as conventional cloud compute node (CCN).

An embodiment in the QCE receives the job. The embodiment determines whether there exists a portion in the job which is either requesting quantum processing, is suitable for quantum processing, or both. As one non-limiting example, a job may encode a portion of the job instructions using a quantum processing language, such as including but not limited to Quantum Assembly Language (QASM). The embodiment recognizes such a portion as requesting quantum processing.

As another non-limiting example, the embodiment may analyze a set of job instructions in a portion that has been encoded using a conventional processing language, for example, including but not limited to instructions in a language conforming to Instruction Set Architecture (ISA), such as assembly language, C++, or Java (Java is a trademark of Oracle Corporation in the United States and in other countries.) In one case, the embodiment may determine that an operation requested in such a portion is implemented in, or computable using, a particular q-processor implemented in a QCCN in the QCE. Accordingly, the embodiment concludes that the portion of the job is particularly suited for processing using quantum processing in the given QCE. The embodiment therefore identifies the portion for quantum processing.

In some cases, a job portion may request quantum processing, such as by including QASM code, but an embodiment may determine that the operations requested, or the qubits needed for the computation in the code, an error rate tolerated by the job/portion/instruction/code is inconsistent with the qubit configuration in the implemented QCCN. For example, a quantum processing instruction might call for six qubits but the QCCN in the QCE is implemented using only four qubits. As another example, a quantum processing instruction might use an operation that is inefficient or impossible using the particular QCCN configuration in the QCE. As another example, a job including a quantum processing instruction might have an error tolerance for a computation that is lower than an error in the output of the particular QCCN configuration in the QCE, and to use the QCCN to achieve the lower error value according to the tolerance would be an inefficient use of the QCCN. Thus, it is possible for an embodiment in these and many other circumstances to determine that despite requesting quantum processing, a job or a portion thereof should be computed using a CCN.

Operating in this manner, an embodiment identifies a portion of a submitted job where the portion is suitable for q-processing. The job may include one or more portions, which the embodiment identifies as suitable for q-processing using a QCCN. Additionally, the embodiment may identify zero or more portions of the job as suitable for conventional computing using a CCN.

Once a portion of a submitted job is identified as q-processing suitable, an embodiment compiles the portion. This compilation performed by the embodiment is different from the traditional code compilation in several respects. For example, the compilation performed by the embodiment on a portion of a job is quantum-computing-specific in that the compilation at least determines and sets a number of qubits that are going to be needed to perform the computation contemplated in the portion. In one embodiment, the compilation further optimizes, or attempts to optimize, the number of qubits needed for the computation to a maximum of the number of qubits available in a QCCN in the QCE. If such optimization is successful, the embodiment proceeds to further compile or schedule the portion as described herein for q-processing. If such optimization is unsuccessful, i.e., when the number of qubits cannot be reduced to the maximum number of qubits available in a QCCN, the embodiment compiles or schedules the portion as described herein for conventional processing.

As another example, the compilation performed by the embodiment on a portion of a job is quantum-computing-specific in that the compilation at least determines and sets a type of mathematical operation that is going to be needed to perform the computation contemplated in the portion. In one embodiment, the compilation further optimizes, or attempts to optimize, the operation needed for the computation to be performable using one or more other operations configured in a QCCN in the QCE. If such optimization is successful, the embodiment proceeds to further compile or schedule the portion as described herein for q-processing. If such optimization is unsuccessful, i.e., when the operation needed in the portion cannot be performed using a combination of available operations in a QCCN, the embodiment compiles or schedules the portion as described herein for conventional processing.

As another example, the compilation performed by the embodiment on a portion of a job is quantum-computing-specific in that the compilation at least determines and sets an error tolerance that is going to be needed by the computation contemplated in the portion. In one embodiment, the compilation further optimizes, or attempts to optimize, the error tolerance needed for the computation to no less than a minimum error known to exist in an output of a QCCN in the QCE. If such optimization is successful, the embodiment proceeds to further compile or schedule the portion as described herein for q-processing. If such optimization is unsuccessful, i.e., when the tolerance cannot be increased to the minimum error of a QCCN, the embodiment compiles or schedules the portion as described herein for conventional processing.

These examples of quantum compilation functions are not intended to be limiting on the illustrative embodiments. Many other quantum compilation functions will be conceivable from this disclosure by those of ordinary skill in the art, and the same are contemplated within the scope of the illustrative embodiments. For example, the compilation performed by an embodiment on a portion of a job can be quantum-computing-specific in many other ways as well. In one such example, the compilation at least attempts to—combine q-processing instructions resulting from the portion, arrange such q-processing instructions, reduce such q-processing instructions, or otherwise organize the q-processing instructions—in such a manner that a utilization of a QCCN for computing the portion is reduced, a mathematical operation implemented in the QCCN is utilized, distinct quantum instructions are arranged closer together in the compiled portion from their initial places in the original job portion, and/or distinct quantum instructions are linked with one another in the compiled portion.

As another example, a job may specify a portion using a quantum instruction language, such as QASM. However, an embodiment may find that the quantum parameters of the q-processing required by the portion are not compatible with the QCCN that is available in the QCE. In such a case, the quantum-computing-specific operation of the embodiment converts the portion from quantum instruction language to a conventional instruction language, for conventional processing.

An embodiment assigns a q-instruction from a compiled portion to a q-resource. A q-processor is an example of a q-resource. Generally, a q-resource is any manifestation of a qubit or a quantum computing resource that operates on one or more principles of quantum mechanics, as described earlier.

For example, assume that multiple QCCNs are operating in the QCE, one QCCN being configured with four qubits and another QCCN being configured with eight qubits. A q-instruction that utilizes only four qubits better utilizes the 4-qubit QCCN than the 8-qubit QCCN.

Similarly, although such is not necessarily the case with an actual implementation, assume that one QCCN is configured to perform an addition operation and another QCCN is configured to perform a multiplication operation. A q-instruction that multiplies two large numbers better utilizes the configuration for the multiplication operation rather than repeatedly using the addition configuration to reach the same result.

The operations of a QCCN are generally configured in terms of logic gates, which implement these and other mathematical operations. A manner of optimizing q-instruction processing is by optimizing a number of gates used in the computation.

These non-limiting examples demonstrate that assigning different q-instructions to different QCCNs can have real and measurable consequences. The consequence can be simply a computational cost difference, or can be an error in the final result. For example, if the multiplication operation is performed once and a quantum output signal is measured once, the error in that output is likely to be less than the cumulative error from cumulative repeated additional operations in another quantum output.

For these and other reasons, an embodiment assigns a set of one or more q-instructions from a compiled portion of the submitted job to a specific QCCN operating in the QCE. As a part of the embodiment assigning the set of q-instructions to a specific QCCN, the embodiment determines whether the QCCN has an associated queue of q-instructions awaiting execution on the QCCN.

If such a queue or other scheduling mechanism exists for the selected QCCN, the embodiment enters the set of q-instructions in the queue or the configured scheduling mechanism. Depending upon the operation of the queue or the scheduling mechanism, the set of q-instructions are selected for execution by the QCCN at a suitable time. If such a queue or other scheduling mechanism does not exist for the selected QCCN, the embodiment may execute the set of q-instructions on the QCCN immediately.

Recall that a portion of the submitted job may have been compiled by an embodiment using conventional instructions. Such conventional instructions are similarly scheduled for execution on a suitable CCN according to known conventional cloud computing methods.

The execution of q-instruction(s) on a QCCN produces a signal output from the QCCN. The execution of the conventional instruction(s) on a CCN produces a conventional result.

An embodiment determines whether the submitted job is already instrumented for error handling. Error correction is a type of error handling. A job can be instrumented for error handling by including code that corrects or otherwise accounts for an expected error in a result of a computation. The embodiment identifies such instrumentation in the job and configures an error handling operation relative to the QCCN output. One type of error handling is configured in a hardware mechanism that collects and processes the output signal of the q-processor. Such a hardware mechanism in a QCCN is referred to as a hardware chain.

The output signal is a detected quantum state of a particle used in a particular implementation of the qubits in a q-processor. Some non-limiting examples of the output signals include—polarization and/or number of photons, time of arrival of photons, a coherent state of photons in a beam, a spin of an electron, an electron charge or a number of electrons, spin of an atomic nucleus, an atomic spin in a lattice, a charge of a Josephson junction in a superconducting charge qubit, a current of a Josephson junction in a superconducting flux qubit, an energy of a Josephson junction in a superconducting phase qubit, electron localization in a singly charged quantum dot pair, a dot spin of a quantum dot, and many others.

The hardware chain-based error handling measures an output signal of a q-processor. Some signal error detection and correction can be performed in the hardware chain, such as by applying verifying the output signal by another means, correlating one output signal with another output signal, or recreating the output signal in a repeat operation of a qubit. In some cases, where the job is suitably instrumented, an error handling in the hardware chain can be minimized, reduced, altered, or omitted, as the case may be in a specific implementation.

An embodiment causes a measured or hardware chain-corrected output signal to be demodulated using a suitable known signal modulation/demodulation technology. The embodiment digitizes the demodulated signal such that binary data can be extracted from the digitized demodulated signal.

An embodiment uses the digitized signal to compute a binary-represented q-result. One or more q-results may be obtained for a q-processed portion of the job.

Optionally, one embodiment further applies one or more post-processing operations to the q-result. One example of the post-processing is software-based error handling to the q-result. The applying of the error handling at this stage is also dependent upon the error handling instrumentation within the code of the job. An example manner of error handling, e.g., error detection and/or error correction, includes applying a statistical algorithm or model to the q-result. For example, if multiple q-result values were obtained for the same or similar set of q-instructions, a statistical model can ascertain whether a particular value of the q-result are more likely, less likely, or equally likely as compared to another value of the q-result. As an example of the error handling operation of the embodiment, the example model in this case would select the most likely value from the multiple values for the q-result.

When a conventional result is also obtained from conventional computation of another portion of the job, another type of post-processing may be needed. For example, an embodiment combines the conventional result with the q-result. The combining operation can be implemented in any suitable manner dependent upon the nature of computations, types of results, and the expectation of the job in any given implementation of the illustrative embodiments.

The combining operation produces a final result. An embodiment delivers the final result to the job submitter in response to receiving the job from the submitter.

The manner of job processing in quantum computing enabled cloud environments described herein is unavailable in the presently available methods. A method of an embodiment described herein, when implemented to execute on a CN relative to a QCCN, comprises substantial advancement of the functionality of the QCE in managing purely quantum processing workloads or mixed quantum and conventional processing workloads in a QCE.

The illustrative embodiments are described with respect to certain types of jobs, instructions, q-instructions, compilation operations, assignment logic, q-processors, QCNs, output signals, error handling, post-processing, transformations or conversions, algorithms, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
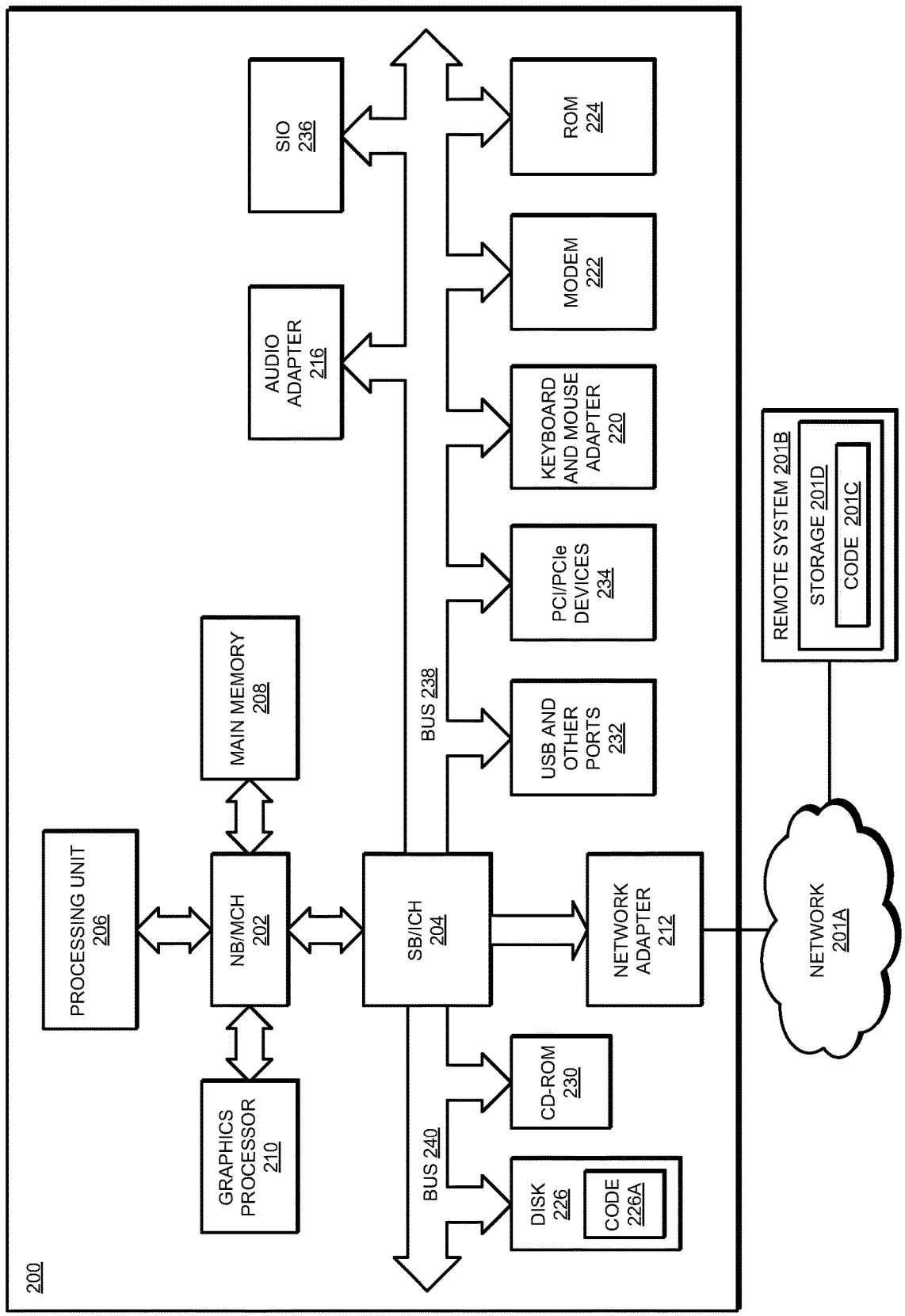
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Cloud 140 is an example of a QCE described herein. As an example, QCE 140 includes CCN 104, 106, and many other similar CCNs 142. As an example, CCNs 106 and 142 may be configured as cluster 144 of CCNs. QCE 140 further includes one or more QCCNs, such as QCCN 146. A QCCN, such as QCCN 146, comprises one or more q-processors 148. A currently viable qubit is an example of q-processor 148. Application 105 implements an embodiment described herein. Application 105 operates on a CCN, such as server 104 in QCE 140. Client 110 may configure job 111 and operate as a sender of job 111 to QCE 140 in a manner described herein.

QCE 140 may couple to network 102 using wired connections, wireless communication protocols, or other suitable data connectivity. Clients 110, 112, and 114 may be, for example, personal computers or network computers. Network 102 may represent a collection of networks and gateways that use the Transmission Control Protocol/Internet Protocol (TCP/IP) and other protocols to communicate with one another. FIG. 1 is intended as an example, and not as an architectural limitation for the different illustrative embodiments.

Data processing environment 100 as a whole may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a conventional data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
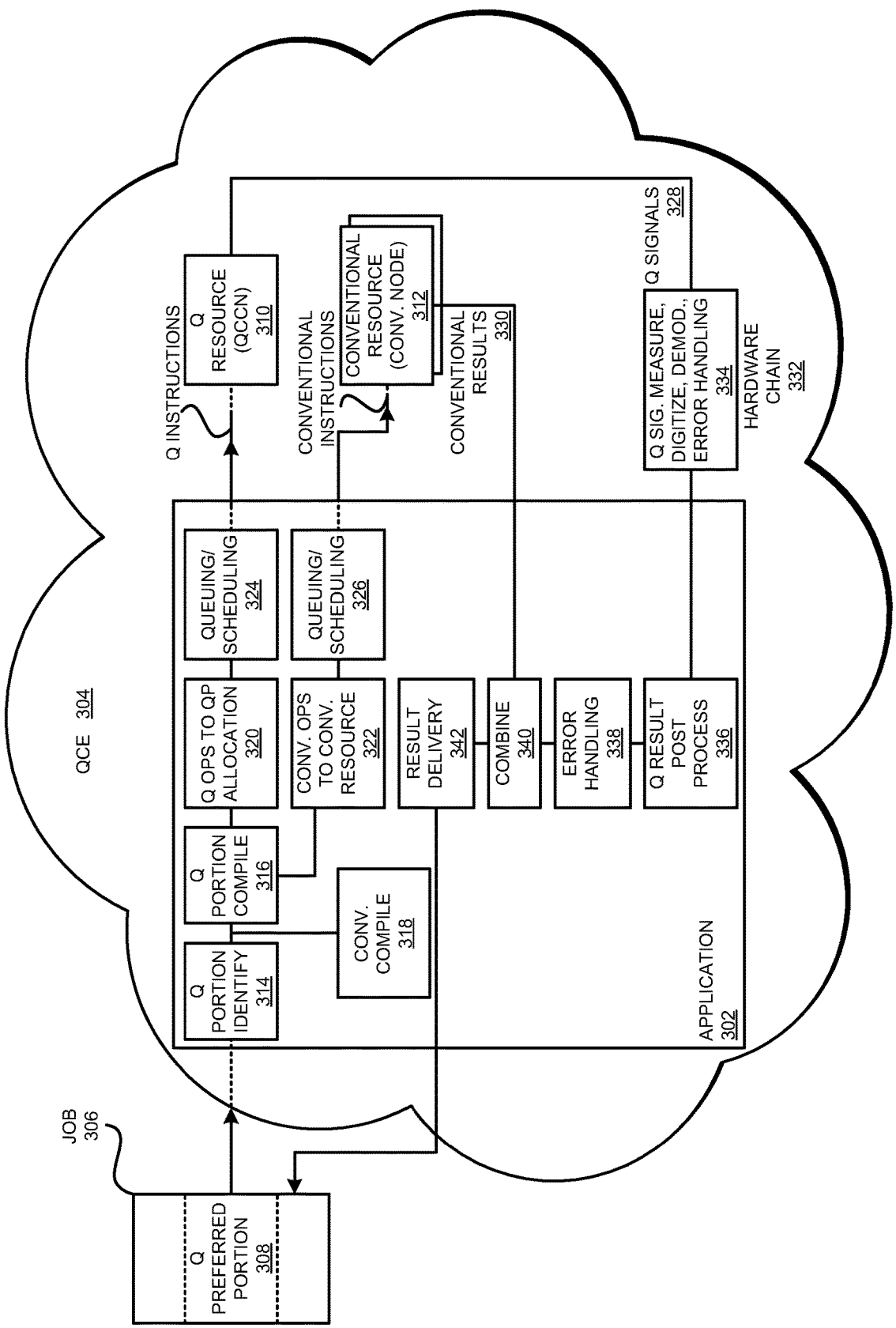
FIG. 3 depicts a block diagram of an example configuration for job processing in quantum computing enabled cloud environments in accordance with an illustrative embodiment.

With reference to FIG. 3, this figure depicts a block diagram of an example configuration for job processing in quantum computing enabled cloud environments in accordance with an illustrative embodiment. Application 302 is an example of application 105 in FIG. 1. QCE 304 is an example of QCE 140 in FIG. 1.

Job 306 is an example of job 111 in FIG. 1. Assume that whether indicated as such in some manner within job 306 or not, a portion 308 of job 306 is preferred to be executed using quantum computing.

QCE 304 includes QCCN 310 and CCN 312 as described herein. While only one instance each of QCCN 310 and CCN 312 are shown, one or more of QCCN 310 and zero or more of CCN 312 can exist in QCE 304. Preferably, at least one CCN exists in QCE 304 on which application 302 can be executed, on which conventional computing can be performed, or both. As depicted application 302 can execute on CCN 312 or another CCN in QCE 304.

When job 306 is received in QCE 304, function 314 identifies portion 308 (q-portion) as preferring, or suitable for, q-computing. Function 316 compiles the q-portion of job 306. Function 318 performs conventional compilation of a conventional portion of job 306. Function 316 may output q-instructions 320 (q-operations or q-ops), which are sent for QCCN assigning (QP allocation or q-processor allocation) as described herein. For one or more reasons described herein, function 316 may also output conventional instructions 322 (conventional-operations or conv. ops), which are sent for conventional resource assignment.

Function 324 assigns a q-instruction to a QCCN, or even to a particular quantum processor therein using the queuing and scheduling mechanism as described herein. Function 326 assigns a conventional instruction to a CCN, using the corresponding queuing and scheduling mechanism.

A queued or scheduled q-instruction executes on QCCN 310 and produces output signals 328 (q-signals). A queued or scheduled conventional instruction executes on CCN 312 and produces conventional results 330.

Hardware chain 332 performs function 334. Function 334 includes signal measurement, error handling, demodulation, digitization, or some combination thereof. Function 334 produces one or more q-results.

Post-process function 336 and optional software-based error handling function 338 operate on the q-results as described earlier. Function 340 combines post-processed q-results and conventional results 330. Function 342 delivers the combined final results as the processing outcome of job 306.

Figure 4:
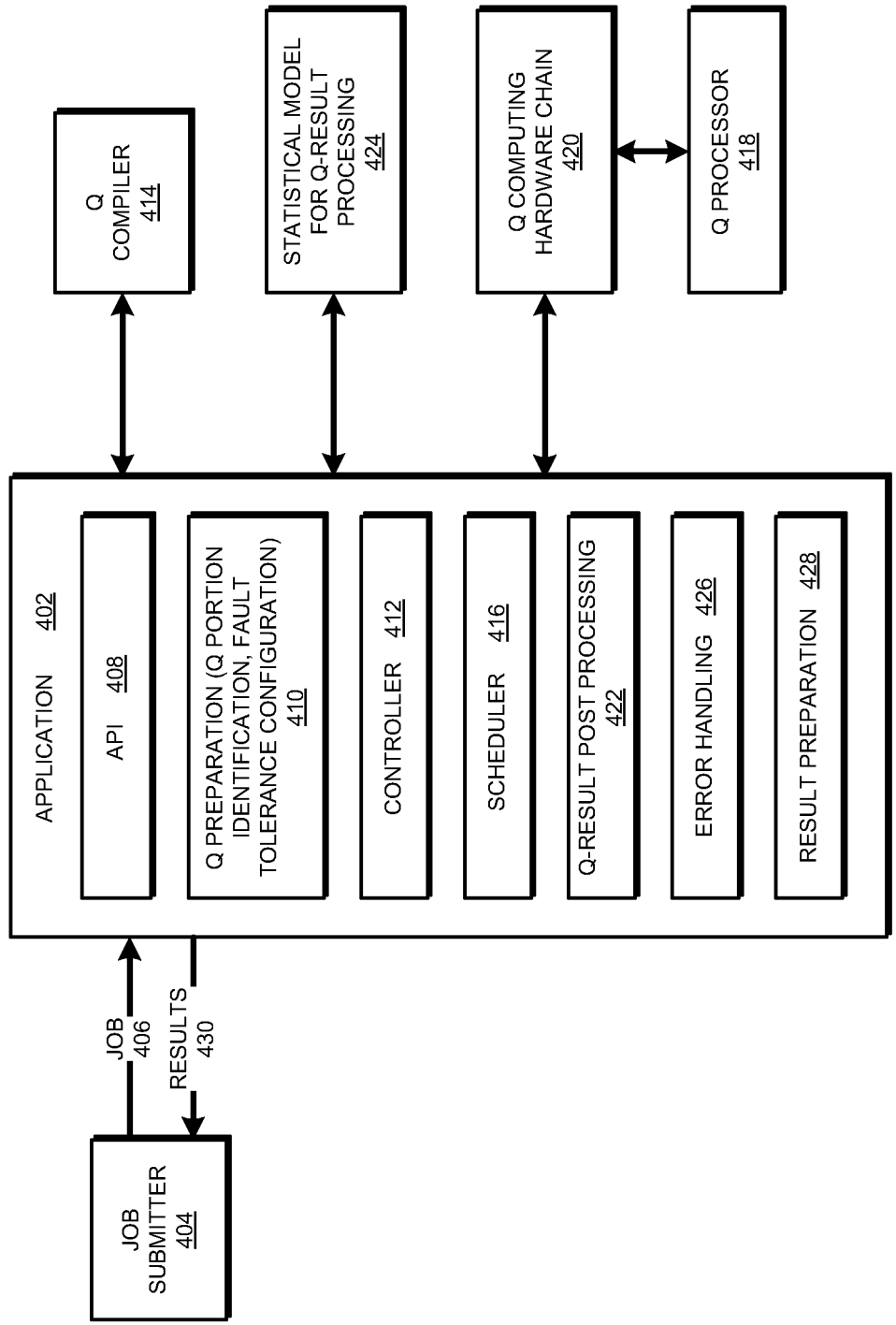
FIG. 4 depicts a block diagram of an application for job processing in quantum computing enabled cloud environments in accordance with an illustrative embodiment.

With reference to FIG. 4, this figure depicts a block diagram of an application for job processing in quantum computing enabled cloud environments in accordance with an illustrative embodiment. Application 402 implements the functions depicted and described in application 302 in FIG. 3.

Job submitter 404 submits job 406 to a QCE, such as QCE 304 in FIG. 3. Particularly, submitter 404 uses Application Programming Interface (API) 408 presented by application 402. Job 406 is an example of job 306 in FIG. 3.

Component 410 performs quantum preparation functions, such as the identification of a quantum-processing-suitable portion (q-portion) of job 404, fault tolerance instrumentation determination and error handling configuration. Controller component 412 in conjunction with quantum compiler (q-compiler) 414 compiles the q-portion. Q-compiler 414 is configured to create, translate, or optimize, instructions for quantum computing in a suitable quantum instruction language, such as QASM. Controller component 412 also uses a suitable conventional compiler (not shown) to compile conventional instructions in one or more circumstances described herein.

Scheduler component 416 queues or schedules the q-instructions for execution of a QCCN. When conventional instructions are also compiled, scheduler component 416 also queues or schedules the conventional instructions for execution of a CCN.

Q-processor 418 computes a q-instruction and produces an output signal. Hardware chain 420 processes the output signal and produces a q-result. Component 422 obtains the q-result from hardware chain 420 and uses one or more models, such as statistical model 424, to post-process the q-result.

Optionally, component 426 performs software-based error handling on the q-result. Component 428 combines any conventional results with the post-processed q-results and prepares final result 430. Component 428 delivers final result 430 to job submitter 404.

Figure 5:
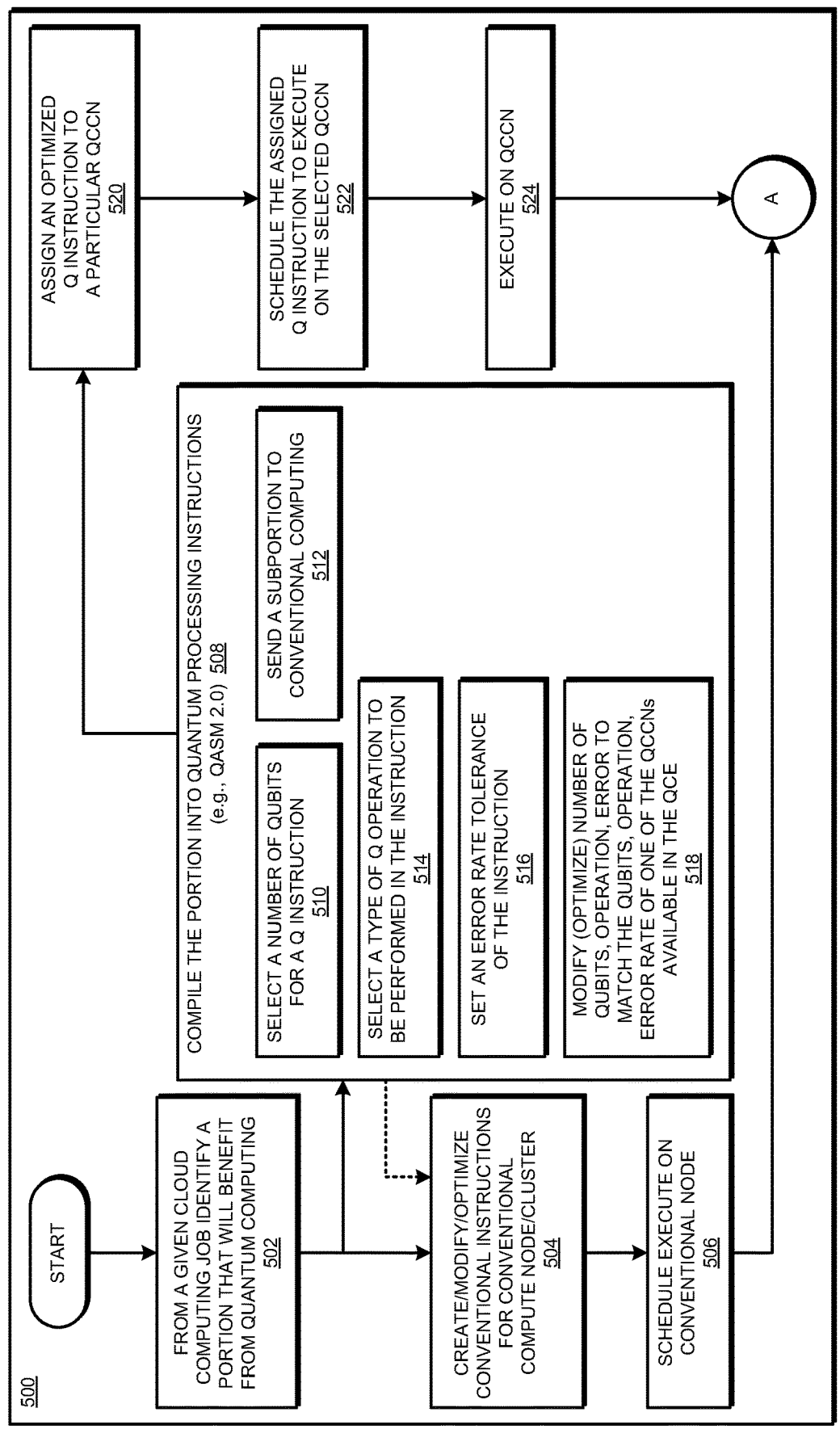
FIG. 5 depicts a flowchart of a part of a process for job processing in quantum computing enabled cloud environments in accordance with an illustrative embodiment.

With reference to FIG. 5, this figure depicts a flowchart of a part of a process for job processing in quantum computing enabled cloud environments in accordance with an illustrative embodiment. Process 500 can be implemented in application 402 in FIG. 4.

From a submitted cloud computing job, the application identifies a portion that will benefit from quantum computing in the QCE (block 502). When the job includes a portion for conventional computing, the application creates, modifies, or optimizes conventional instructions for execution on a CCN in the QCE (block 504). The application schedules and executes the conventional instructions on the CCN (block 506). The application exits process 500 via exit "A" to enter process 600 via corresponding entry "A".

When a q-portion has been identified at step 502, the application compiles the q-portion into q-instructions (block 508). The compiling process can include a combination of sub-steps 510, 512, 514, 516, 518, and other similarly purposed sub-steps that will be apparent from this disclosure to those of ordinary skill in the art. For example, sub-step 510 selects a suitable number of qubits for a q-instruction. When the entire q-portion should not or cannot be processed using quantum computing, sub-step 512 sends a sub-portion of the q-portion to block 504 for conventional computing. Sub-step 514 selects a type of quantum operation to be performed in a q-instruction. Sub-step 516 sets an error rate tolerance of the q-instruction. Sub-step 518 modifies or optimizes the number of qubits, the types of q-operations, the value of the error rate to correspond to the qubits, operations, and error rate of a particular QCCN available in the QCE.

The application assigns the q-instruction to the particular QCCN used in the compilation step 508 (block 520). The application schedules the q-instruction for execution on that selected QCCN (block 522). The application executes the q-instruction on that QCCN (block 524). The application exits process 500 via exit "A" to enter process 600 via corresponding entry "A".

Figure 6:
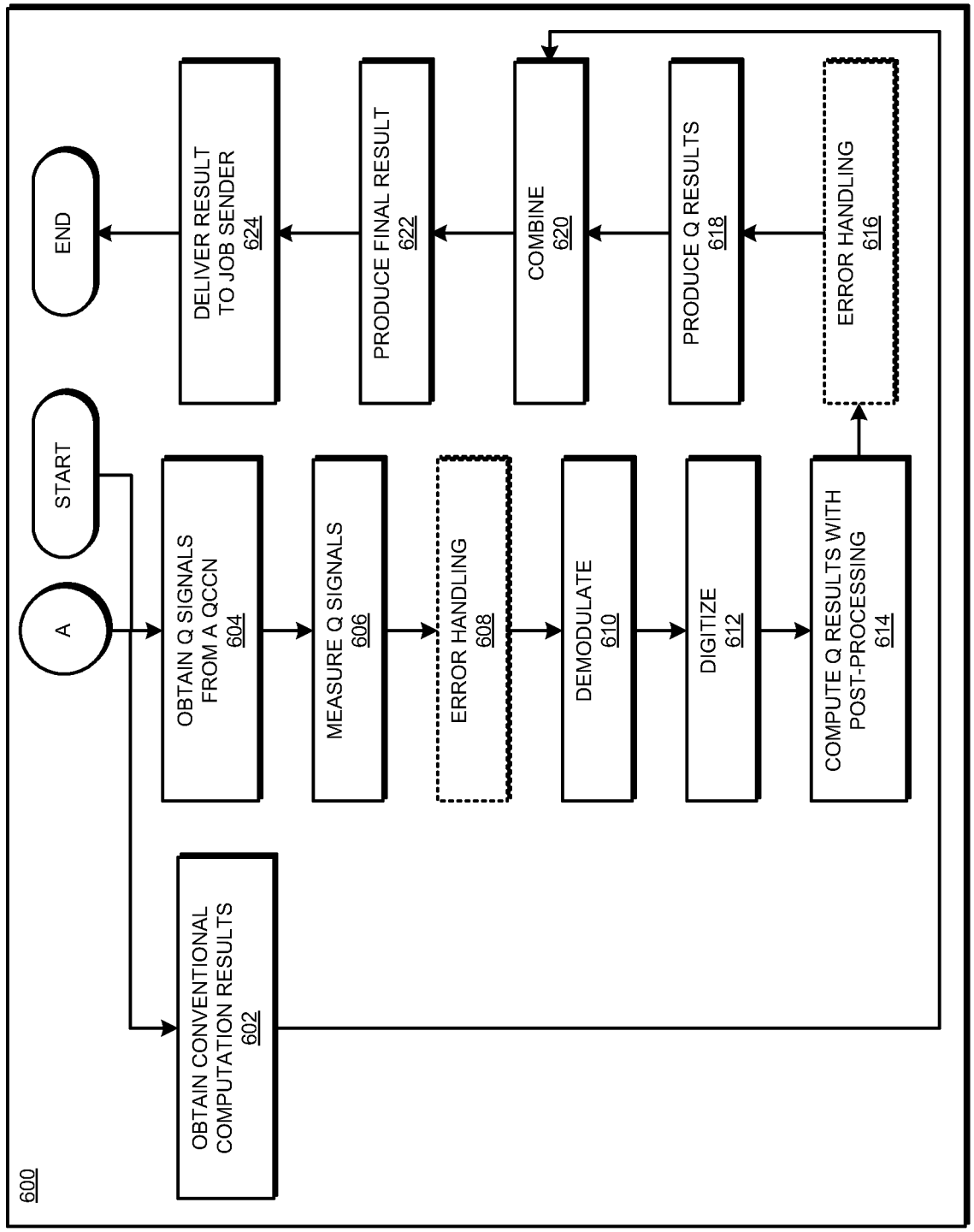
FIG. 6 depicts a flowchart of another part of a process for job processing in quantum computing enabled cloud environments in accordance with an illustrative embodiment.

With reference to FIG. 6, this figure depicts a flowchart of another part of a process for job processing in quantum computing enabled cloud environments in accordance with an illustrative embodiment. Process 500 can be implemented in application 402 in FIG. 4.

The application obtains a conventional result from any conventional computing that may have been performed in process 500 (block 602). The application obtains an output signal (q-signal) from the processing of the q-instruction on the selected QCCN (block 604).

The application performs signal measurement (block 606), optional hardware-based error handling (block 608), demodulation of the signal (block 610), and digitization of the demodulated signal (block 612). The application computes a post-processed q-result (block 614). The application optionally performs software-based error handling as needed in the circumstances described herein (block 616). The application thus produces a processed q-result (block 618), which can be combined with a conventional result, if any (block 620).

The application produces a final result from the combining operation (block 622). The application delivers the final result to the job submitting system (block 624). The application ends process 600 thereafter.

Thus, a computer implemented method, system or apparatus, and computer program product are provided in the illustrative embodiments for job processing in quantum computing enabled cloud environments and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
ascertaining a compatibility between a configuration of a quantum processor (q-processor) of a quantum cloud compute node (QCCN) in a quantum cloud environment (QCE) and an operation requested in a first instruction in a portion (q-portion) of a job submitted to the QCE, the QCE comprising the QCCN and a conventional compute node (CCN), the CCN comprising a conventional processor configured for binary computations;

constructing, responsive to the ascertaining, a quantum instruction (q-instruction) corresponding to the first instruction;

executing the q-instruction using the q-processor of the QCCN to produce a quantum output signal (q-signal);

transforming the q-signal into a corresponding quantum computing result (q-result).

2. The method of claim 1, further comprising:
correcting an error in the q-signal using hardware associated with the q-processor to produce a corrected q-signal.

3. The method of claim 1, further comprising:
demodulating the q-signal;
digitizing the q-signal; and
extracting an initial quantum computing result (initial q-result) from the digitized q- signal.

4. The method of claim 3, further comprising:
post-processing the initial q-result, wherein the post-processing comprises applying a statistical model to the initial q-result to obtain the q-result, and wherein the q-result has a greater-than threshold probability of being a correct result computed by the q-processor.

5. The method of claim 1, wherein the q-instruction is encoded using a quantum instruction language.

6. The method of claim 5, wherein the quantum instruction language comprises Quantum Assembly Language (QASM).

7. The method of claim 1, further comprising:
constructing, responsive to determining that a second instruction in the q-portion is incompatible with a quantum computing configuration of a q-processor in the QCCN, a conventional instruction corresponding to the second instruction; and
executing the conventional instruction on a conventional compute node (CCN), the CCN comprising a conventional processor configured for binary computations.

8. The method of claim 7, further comprising:
obtaining a conventional result from executing the conventional instruction on the CCN; and
combining the conventional result with the q-result to produce a final result.

9. The method of claim 1, further comprising:
constructing, corresponding to an instruction in a second portion in the job, a conventional instruction; and
scheduling the conventional instruction to execute on a conventional compute node (CCN) in the QCE.

10. The method of claim 1, wherein the QCCN is one of a set of QCCNs.

11. The method of claim 1, wherein the configuration of the q-processor comprises a number of qubits available in the q-processor, and wherein the ascertaining comprises determining that the operation is performable using the number of qubits.

12. The method of claim 1, wherein the configuration of the q-processor comprises a type of operation configured to be performed by the q-processor, and wherein the ascertaining comprises determining that the operation requested in the first instruction is performable using a second operation configured in the q-processor, the second operation using a set of qubits.

13. The method of claim 1, wherein the configuration of the q-processor comprises an error rate in the q-signal produced by the q-processor, wherein the ascertaining comprises determining that an error tolerance of the q-portion is at least equal to the error rate.

14. The method of claim 1, further comprising:
identifying, in the job, the q-portion using an indication associated with the q-portion, the indication referring to a suitability of the q-portion for quantum computing.

15. The method of claim 1, further comprising:
identifying, in the job, the q-portion using the operation requested in the first instruction, the operation being configured in the QCCN using the q-processor.

16. A quantum cloud environment (QCE) comprising:
a quantum cloud compute node (QCCN) comprising a quantum processor (q-processor); and
a computer usable program code which when executed using the a conventional processor causes functions comprising:
ascertaining a compatibility between a configuration of the q-processor of the QCCN and an operation requested in a first instruction in a portion (q-portion) of a job submitted to the QCE, the QCE comprising the QCCN and a conventional compute node (CCN), the CCN comprising the conventional processor configured for binary computations;
constructing, responsive to the ascertaining, a quantum instruction (q- instruction) corresponding to the first instruction;
executing the q-instruction using the q-processor of the QCCN to produce a quantum output signal (q-signal);
transforming the q-signal into a corresponding quantum computing result (q-result).

17. The QCE of claim 16, the functions further comprising:
correcting an error in the q-signal using hardware associated with the q-processor to produce a corrected q-signal.

18. The QCE of claim 16, the functions further comprising:
demodulating the q-signal;
digitizing the q-signal; and
extracting an initial quantum computing result (initial q-result) from the digitized q- signal.

19. The QCE of claim 18, the functions further comprising:
post-processing the initial q-result, wherein the post-processing comprises applying a statistical model to the initial q-result to obtain the q-result, and wherein the q-result has a greater-than threshold probability of being a correct result computed by the q-processor.

20. The QCE of claim 16, wherein the q-instruction is encoded using a quantum instruction language.

21. The QCE of claim 20, wherein the quantum instruction language comprises Quantum Assembly Language (QASM).

22. A computer usable program product comprising one or more computer-readable storage devices, and program instructions stored on at least one of the one or more storage devices, the stored program instructions comprising:
program instructions to ascertain a compatibility between a configuration of a quantum processor (q-processor) of a quantum cloud compute node (QCCN) in a quantum cloud environment (QCE) and an operation requested in a first instruction in a portion (q-portion) of a job submitted to the QCE, the QCE comprising the QCCN and a conventional compute node (CCN), the CCN comprising the conventional processor configured for binary computations;
program instructions to construct, responsive to the ascertaining, a quantum instruction (q-instruction) corresponding to the first instruction;
program instructions to execute the q-instruction using the q-processor of the QCCN to produce a quantum output signal (q-signal); and
program instructions to transform the q-signal into a corresponding quantum computing result (q-result).

23. The computer usable program product of claim 22, wherein the computer usable code is stored in a computer readable storage device in a data processing system, and wherein the computer usable code is transferred over a network from a remote data processing system.

24. The computer usable program product of claim 22, wherein the computer usable code is stored in a computer readable storage device in a server data processing system, and wherein the computer usable code is downloaded over a network to a remote data processing system for use in a computer readable storage device associated with the remote data processing system.

25. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to ascertain a compatibility between a configuration of a quantum processor (q-processor) of a quantum cloud compute node (QCCN) in a quantum cloud environment (QCE) and an operation requested in a first instruction in a portion (q-portion) of a job submitted to the QCE, the QCE comprising the QCCN and a conventional compute node (CCN), the CCN comprising the conventional processor configured for binary computations;
program instructions to construct, responsive to the ascertaining, a quantum instruction (q-instruction) corresponding to the first instruction;
program instructions to execute the q-instruction using the q-processor of the QCCN to produce a quantum output signal (q-signal); and
program instructions to transform the q-signal into a corresponding quantum computing result (q-result).

* * * * *